United States Patent [19]

Hirst

[11] Patent Number: 5,901,319
[45] Date of Patent: May 4, 1999

[54] SYSTEM AND METHODS FOR GENERATING OPERATING SYSTEM SPECIFIC KERNEL LEVEL CODE FROM OPERATING SYSTEM INDEPENDENT DATA STRUCTURES

[75] Inventor: Michael D. Hirst, Lakeville, Mass.

[73] Assignee: The Foxboro Company, Foxboro, Mass.

[21] Appl. No.: 08/665,087

[22] Filed: Jun. 14, 1996

[51] Int. Cl.[6] .................................................. G06F 17/30
[52] U.S. Cl. .......................... 395/710; 395/685; 395/681; 395/682; 707/100; 707/101; 707/102
[58] Field of Search ..................... 395/710, 701, 395/680–682, 706, 707, 685, 883, 892, 828, 500, 705, 708, 200.33, 200.42, 200.44; 364/280.4, 284, 976.3, 976.1; 707/100–102, 104

[56] References Cited

U.S. PATENT DOCUMENTS

| | | | |
|---|---|---|---|
| 5,182,806 | 1/1993 | McKeeman et al. | 395/710 |
| 5,353,411 | 10/1994 | Nakaosa et al. | 395/681 |
| 5,459,867 | 10/1995 | Adams et al. | 395/828 |
| 5,623,696 | 4/1997 | Johnson et al. | 395/681 |
| 5,724,576 | 3/1998 | Letourneau | 395/701 |

*Primary Examiner*—Hal Dodge Wachsman
*Attorney, Agent, or Firm*—Lahive & Cockfield, LLP

[57] ABSTRACT

A system and method for generating operating system specific kernel level code from one or more data structures that are portable to and compatible with multiple, different operating systems. These data structures are suitable for use with a number of different operating systems without customization. The data structures can contain a plurality of sub-structures, e.g., definitions, function calls and constants and/or a plurality of defines, e.g., system services or function calls, for a plurality of different operating systems.

48 Claims, 7 Drawing Sheets

| | | |
|---|---|---|
| define A | Operating System | A |
| | Operating System | B |
| | Operating System | C |
| | Operating System | N |
| define B | Operating System | A |
| | Operating System | B |
| | Operating System | C |
| | Operating System | N |
| define C | Operating System | A |
| | Operating System | B |
| | Operating System | C |
| | Operating System | N |
| define N | Operating System | A |
| | Operating System | B |
| | Operating System | C |
| | Operating System | N |

SYSTEM AND METHODS FOR GENERATING OPERATING SYSTEM SPECIFIC KERNEL LEVEL CODE FROM OPERATING SYSTEM INDEPENDENT DATA STRUCTURES

BACKGROUND OF THE INVENTION

This invention relates to the portability of code and data structures, and more particularly to the portability of kernel level code functionality using the selected code and data structures to selected operating systems.

Today's burgeoning technology has led to increased automation of factories and other commercial installations. One particular field which is becoming increasingly automated is commercial and industrial process control installations. Modem process control installations typically employ a number of sensors, actuators and other peripheral devices to monitor and to control industrial processes. For example, the sensors might evaluate the suitability of raw materials or monitor the process flow thereof and provide feedback data regarding these and other important parameters. These sensors are typically coupled to one or more processors of a process control system to store data and to generate system control signals in response to the acquired process control data. These processors are typically operated by an operating system which enable the computer to communicate with the process control devices. Representative operating systems include UNIX, DOS, Windows NT, Windows, Solaris SVR4, Microware OS9, and Sun OS.

The installations employing such process control structure also employ commercially available software to facilitate the interfacing of the process control devices with the operating system of the processors of the process control system. This software is not directly integratable with all existing operating systems, however, and thus may have to be customized for a particular operating system by an experienced programmer. For instance, application software designed to operate in a UNIX environment may have to be customized, if at all possible, to operate in a Windows NT or SunOS operating environment. This, of course, increases the total costs associated with installing and operating the automated process control system.

Application programs exist which can interpret a set of software instructions for a first operating system, for example, UNIX, so that they are executable on a second operating system, for example, Windows NT. A known product that performs this type of conversion is the NutCracker software product from Data Focus, U.S.A. This product, however, only allows the porting of software instructions to one particular operating system, and thus may not eliminate the need for an experienced programmer if the software is to be ported to another operating system, e.g., SunOS. Additionally, this software product only generates user level code that performs user level functions.

Due to the foregoing and other shortcomings of conventional application software products, an object of this invention is to provide a software product containing data structures that are portable to a variety of different operating systems.

Another object of this invention is to provide a software product that is relatively easily integratable with existing operating systems.

Other general and more specific objects of the invention will in part be obvious and will in part appear from the drawings and description which follow.

SUMMARY OF THE INVENTION

The present invention provides systems and methods for generating operating system specific kernel level code from one or more data structures that are portable to and compatible with multiple, different operating systems. The data structures of the invention can be used with a number of different operating systems without requiring an experienced programmer to customize the data structures and other software components to the particular operating system defining the working environment.

The inventive data structures allows a user to perform a selected user-defined task by providing a generic set of defines that includes generic function calls for each of a number of different operating systems. The data structure help form a generic interface whereby the user can select one or more predetermined generic defines without concern for the type of operating system and exact procedures that need to be implemented to effectuate that call for the particular operating system. More specifically, the generic data structures of the present invention removes conditional code from the kernel level code for each of a number of operating system and replaces it with the data structure of the present invention. These generic defines thus replace the native function calls and logic that would normally be constructed by a programmer for each particular operating system. This essentially eliminates the need to construct custom code or to modify application programs written according to the teachings of the present invention for the particular operating system.

The invention attains the foregoing and other objects with a system and method for generating operating system specific kernel level code in a computer host device operated by a particular operating system. According to one practice, the method of the present invention includes (1) generating an environment variable, for example in the host device, that is indicative of the particular operating system thereof; (2) providing a first data structure having a plurality of sub-structures, e.g., definitions, function calls and constants, for each of a plurality of differing operating systems; (3) determining the sub-structures corresponding to the particular operating system of the host device, and as identified by the generated environment variable; (4) providing a second data structure having a plurality of defines, e.g., system services or function calls, for a plurality of differing operating systems; (5) determining the defines corresponding to the particular operating system; and (6) linking the selected sub-structures and defines corresponding to the particular operating system to construct kernel level code specific thereto.

According to another aspect, the method of the present invention further includes inputting a series of user-generated instructions, processing the instructions, and linking the instructions with the sub-structures and defines to construct the kernel level code.

According to another aspect, determining the sub-structures of the invention includes storing the first data structure in a memory element of the host device, and selecting from the first data structure the sub-structures corresponding to the particular operating system.

According to yet another aspect, determining the sub-structures can include compiling the first data structure to produce kernel level code specific to the operating system. According to another practice, this includes pre-processing the first data structure, selecting from the processed first data structure the sub-structures that correspond to the particular operating system, and generating the kernel level code.

Likewise, determining the defines, from the second data structure, that correspond to the particular operating system includes storing the second data structure in a memory element, and selecting the defines that correspond to the particular operating system of the host device.

According to another aspect, determining the defines that correspond to the particular operating system can include compiling the second data structure to produce kernel level code specific to the operating system. According to one practice, this includes pre-processing the second data structure, selecting the defines that correspond to the particular operating system, and generating the kernel level code.

According to still another aspect, the method of the present invention includes constructing, from the linked object code generated during compilation, an operating system specific, kernel-level device driver.

According to another aspect, the invention includes constructing the first and second data structures such that the number of operating systems associated with each data structure is greater than the number of operating systems operating the host device. Those of ordinary skill will understand that this relationship is a nonoperational mode relationship, and that there is a one to one correspondence at the operating level of the host device. For example, the data structures can include source code for a number of different operating systems, such that the data structure can be loaded onto, and is compatible with, the particular operating system of the host device. In this way, the data structure is portable to a number of different operating systems, without necessitating the customization of the data structure by an experienced programmer to make it compatible with the operating system of the host device.

The system of the present invention can be utilized to create operating system specific code in a host device operated by a particular operating system. This code can be subsequently used to form a number of kernel level devices, including device drivers. According to one aspect, the system includes a processor for executing and retrieving code and a memory element in communication with the processor. The memory can be used, according to one practice, to store a first data structure having a plurality of sub-structures corresponding to a plurality of differing operating systems, an environment variable indicative of the operating system of the host device, and a second data structure having a plurality of defines corresponding to a plurality of differing operating systems.

The system of the invention also includes a first determination element for determining the sub-structures that correspond to the particular operating system in response to the environment variable, and a second determination element for determining the defines that correspond to the particular operating system in response to the environment variable. A linking element links the sub-structures and the defines to construct operating system specific kernel level code.

According to another aspect, the system includes an input element for inputting user-generated instructions, means for processing the user-generated instructions, and another linking element for linking the processed user-generated instructions with the sub-structures and defines to construct said kernel level code. According to an alternate practice, the first and second linking elements can be the same, identical element.

According to another aspect, the first determination element includes an element for selecting from the first data structure the sub-structures that correspond to the particular operating system.

According to still another aspect, the first or second determination element can include a compiler for compiling the data structure to produce kernel level code specific to the operating system. According to one practice of the invention, the compiler can include a pre-processor for processing the first or second data structure, an element for selecting from either data structure the sub-structures or defines that correspond to the particular operating system, and an object code generator for generating the kernel level code.

The present invention further provides for a machine-readable data storage medium for storing a computer program thereon. The data storage medium includes a first data structure having a plurality of sub-structures corresponding to a plurality of differing operating systems, and a second data structure having a plurality of defines corresponding to a plurality of differing operating systems. According to one practice, the first and second data structures each being stored on the medium are capable of compiled and linked, for example, by a compiler of the host device, to select the sub-structures and defines that correspond to the operating system of the host device. The compiler and linker of the host device then produce kernel level code corresponding the selected operating system.

According to one aspect, the kernel level code can produce a kernel level device driver.

Other general and more specific objects of the invention will in part be obvious and will in part be evident from the drawings and description which follow.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

FIG. 3B is a schematic representation of another embodiment of the data structure of FIG. 3A according to the present invention.

DESCRIPTION OF ILLUSTRATED EMBODIMENTS

Figure 1:
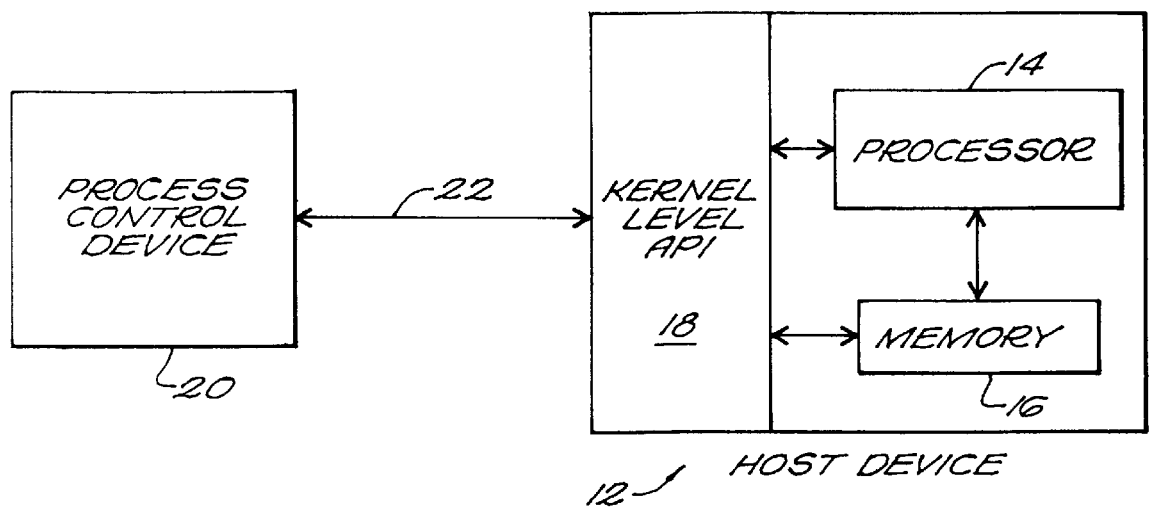
FIG. 1 is a schematic block diagram illustrating the communication that occurs between the kernel level interface of a host device according to the present invention and a peripheral process control device.

FIG. 1 depicts a process control system 10 according to the present invention. The system 10 includes a host device 12 that communicates with the process control device 20 across any conventional communication pathway, generically illustrated as communication pathway 22. The illustrated host device 12 preferably includes a processor 14 that communicates with a memory element 16. The processor 14 and memory 16 both communicate with kernel level code that forms the kernel level application programming interface (API) 18. According to one practice of the present invention, the kernel level code communicates with and controls the process control device 20. The process control device 20 can be any conventional and commercially available process control device, such as a sensor, actuator or other like process control instrumentation. As used herein, the term "host device" is intended to include both a dedicated computer processor and terminal, as well as a client terminal which forms part of a larger network, such as a local area network (LAN). Those of ordinary skill will appreciate that the compilation process of the present invention can occur on or at the process control system itself, or can be remotely compiled prior to introduction to the process control system.

Figure 2:
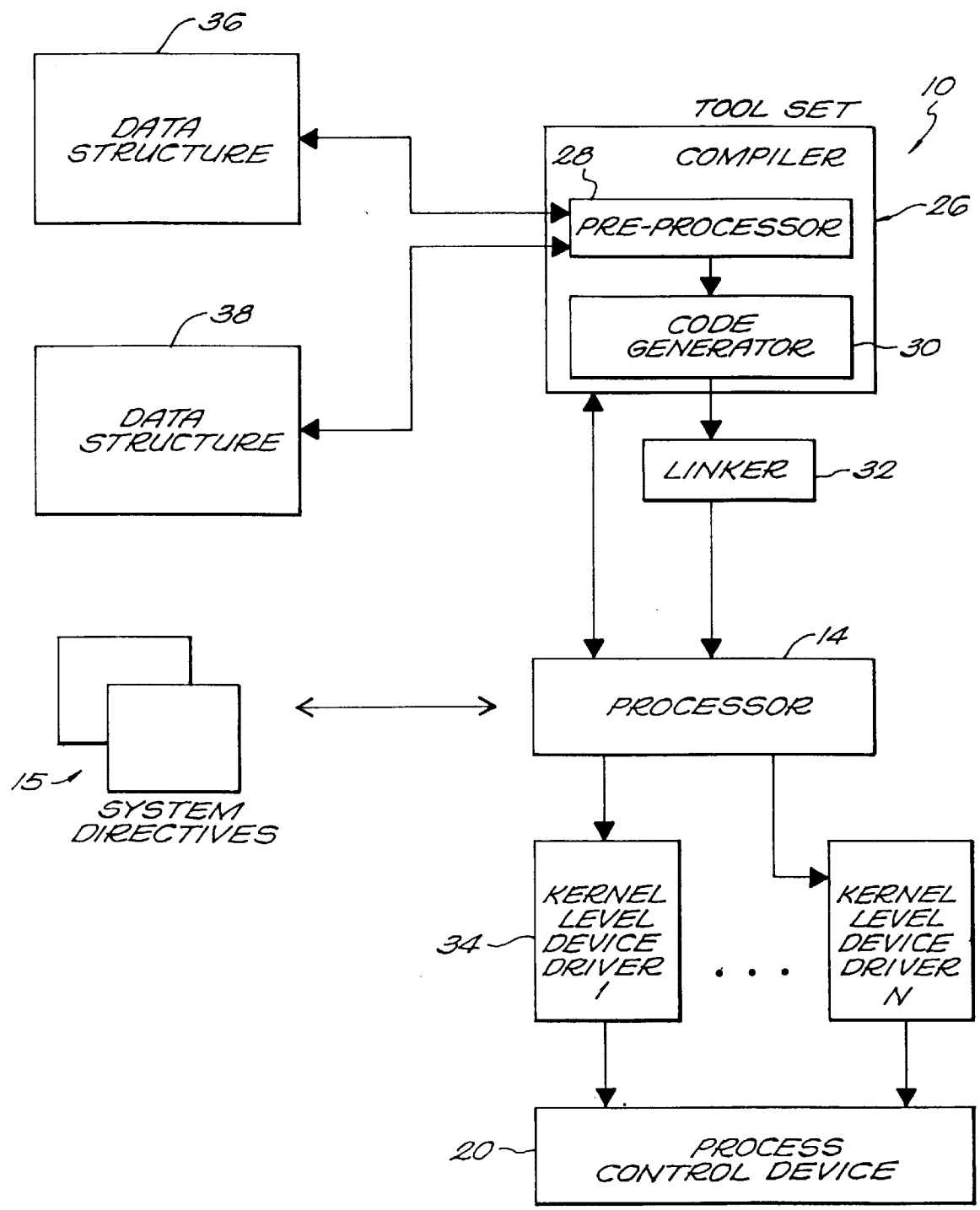
FIG. 2 is a schematic depiction of a system according to the invention for compiling data structures and constructing kernel level code for communication with a peripheral process control device.

FIG. 2 is a schematic representation illustrating the communication pathways between the data structures of the present invention and the compiler 26 of the host device 12, which form part of the process control system 10. The illustrated compiler 26 analyzes the data structures 36, 38 and synthesizes machine language code that when executed correctly performs a selected task as described by a source code program. The compiler 26 includes a preprocessor 28 and a code generator 30. The illustrated process control system 10 further includes a linker 32, the host processor 14, kernel level source code modules 34 represented as device drives 1 through N, and the process control device 20. The foregoing components of the process control system 10, except for the process control device 20, operate within the operating system environment of the host device 12. Those of ordinary skill will recognize that the kernel level device drivers can be duplicated to communicate with other processors of the host device.

Figure 3A:
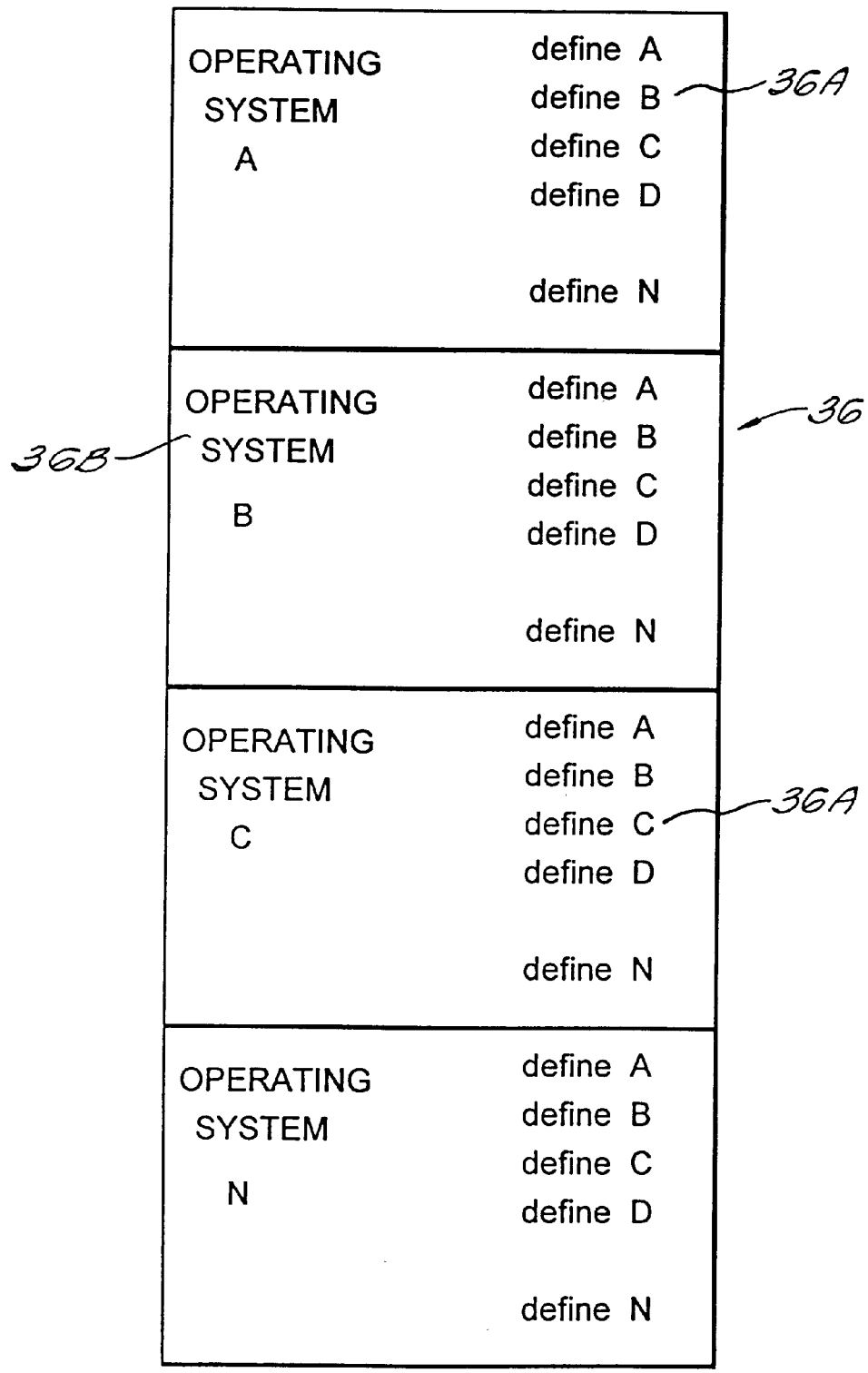
FIG. 3A is a schematic representation of one embodiment of a data structure according to the present invention.
Figure 3C:
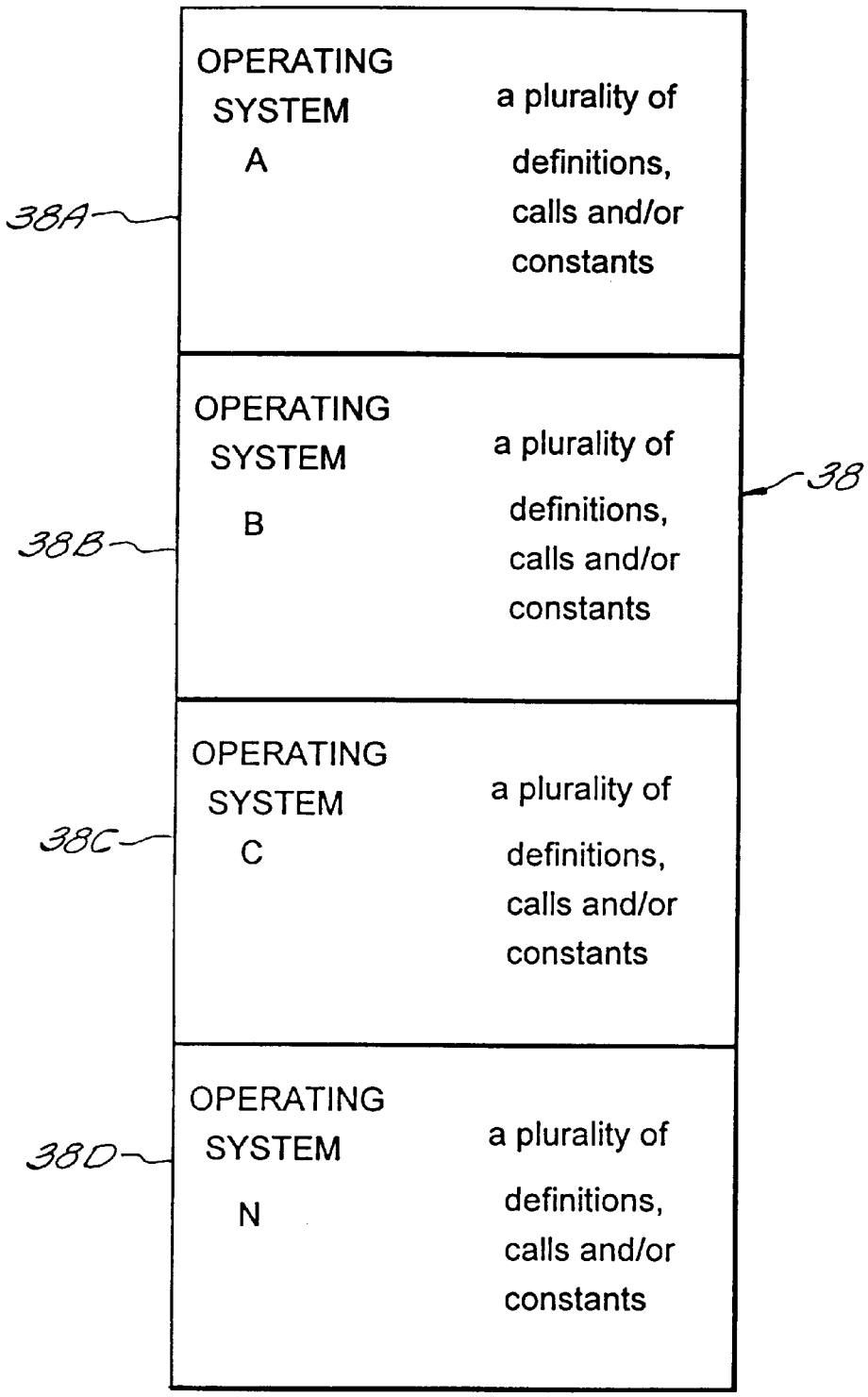
FIG. 3C is a schematic representation of a data structure representative of a generic header file according to the present invention.

The data structures 36, 38 have a structure as shown in FIGS. 3A–3C. The data structure 36 includes a plurality of defines or system services 36A, shown as defines A, B, C, D through N, for each of a plurality of operating systems 36B, illustrated as operating systems A, B, C through N. The defines 36A associated with each operating system can be representative of a number of generic function calls that are native to its associated operating system. For example, defines A through N of operating system A represent generic function calls that are native to operating system A. Likewise, operating systems B, C through N also include a number of defines that are native to its particular operating system.

The illustrated data structure 36 can have any selected number of defines for any selected number of operating systems. Additionally, the data structure can be constructed as a contiguous or non-contiguous data structure. Other constructions would be recognized by those of ordinary skill in computer and electrical engineering and are deemed to comprise part of the present disclosure.

FIG. 3B illustrates an alternate embodiment of the data structure 36 according to the teachings of the present invention. Like numbers plus a superscript prime represent like parts throughout the different figures. The illustrated data structure 36' includes a sub-structure, define A, which is native to operating systems to A, B, C through N. Likewise, the data structure 36' includes a number of sub-structure defines B, C through N which are native to operating systems A, B, C through N. Each of these sub-structures, for example, defines are thus characterized by an associated operating system listing. This is in contrast to the data structure 36 of FIG. 3A, where all the particular defines of a particular operating system are listed. The specific defines of data structures 36 and 36' of the present invention will be set forth in further detail below.

The data structure 38 can have a structure as shown in FIG. 3C. The illustrated data structure 38 can include a plurality of definitions, calls and/or constants for each of a plurality of operating systems illustrated as operating systems A through N. Each operating system code block, e.g., sub-structures 38A–38D, of the data structure 38 preferably includes all the necessary and appropriate definitions, calls, include commands, constants, etc. that are necessary to perform a variety of user-defined tasks for each operating system. The data structure 38 thus represents a generic header file, and each sub-structure 38A–38D represents a specific header file for its corresponding operating system.

The illustrated data structures 36, 38 preferably reside in memory, such as memory element 16, of the host device. Since the illustrated processor 14 is in communication with the memory 16, the processor, and thus the compiler 26, can easily access and retrieve the data structures therefrom. As is well known in the art, the files could be read line by line or in other larger portions.

With reference to FIG. 2, the illustrated compiler 26, which typically resides as a component of a tool set of the host device 12, initially generates an environment variable that flags or identifies to the preprocessor 28 the particular operating system of the host device 12. For example, if the compiler is a Microware OS9 compiler, the operating system generates an environment variable, e.g., such as variable "OSK", that is set or flagged by the compiler.

The illustrated preprocessor 28 of the compiler 26 processes the data structures 36, 38 and selects therefrom the defines and definitions, respectively, associated with the operating system of the host device, as identified by the generated environment variable. The preprocessor 28 thus functions in a manner similar to a filter whereby defines and definitions which are native to environments other than the operating system of the host device are disregarded or 'filtered' out. By way of example, if the host device 12 has a Windows NT operating environment, the compiler 26 generated an environment variable indicative of this operating system. The preprocessor 28 then processes the data structures 36, 38, and selects from data structure 36 all the defines associated with the Windows NT operating system and selects from data structure 38 all the definitions, calls, etc. (header files) associated with the Windows NT system. The output of the preprocessor 28 is inputted to the code generator 30, which generates object level code which is specific to the operating system of the host device 12.

With reference to FIG. 2, the linker 32 is any conventional linker which connects or links together object files to build or construct selected modules of object code. The host processor 14 then determines, by accessing selected system directives 15, the type of kernel level code 34 which is to be generated. For example, if the system directives 15 instruct the processor to form a kernel level device driver from the binary output of the linker, then the processor will construct kernel level device drivers A through N, as illustrated. Those of ordinary skill will recognize that the host processor 14 in conjunction with the system directives 15 can construct various kernel level code and functionalities, such as timing functionalities. According to the teachings of the present invention, the kernel level device drivers which are native to the operating system of the host device 12, interface with the process control device 20. These device drivers thus form a communication interface which allows the host device 12 to regulate or control the peripheral process control device 20. Device drivers are known in the art and need not be described further herein.

Figure 4:
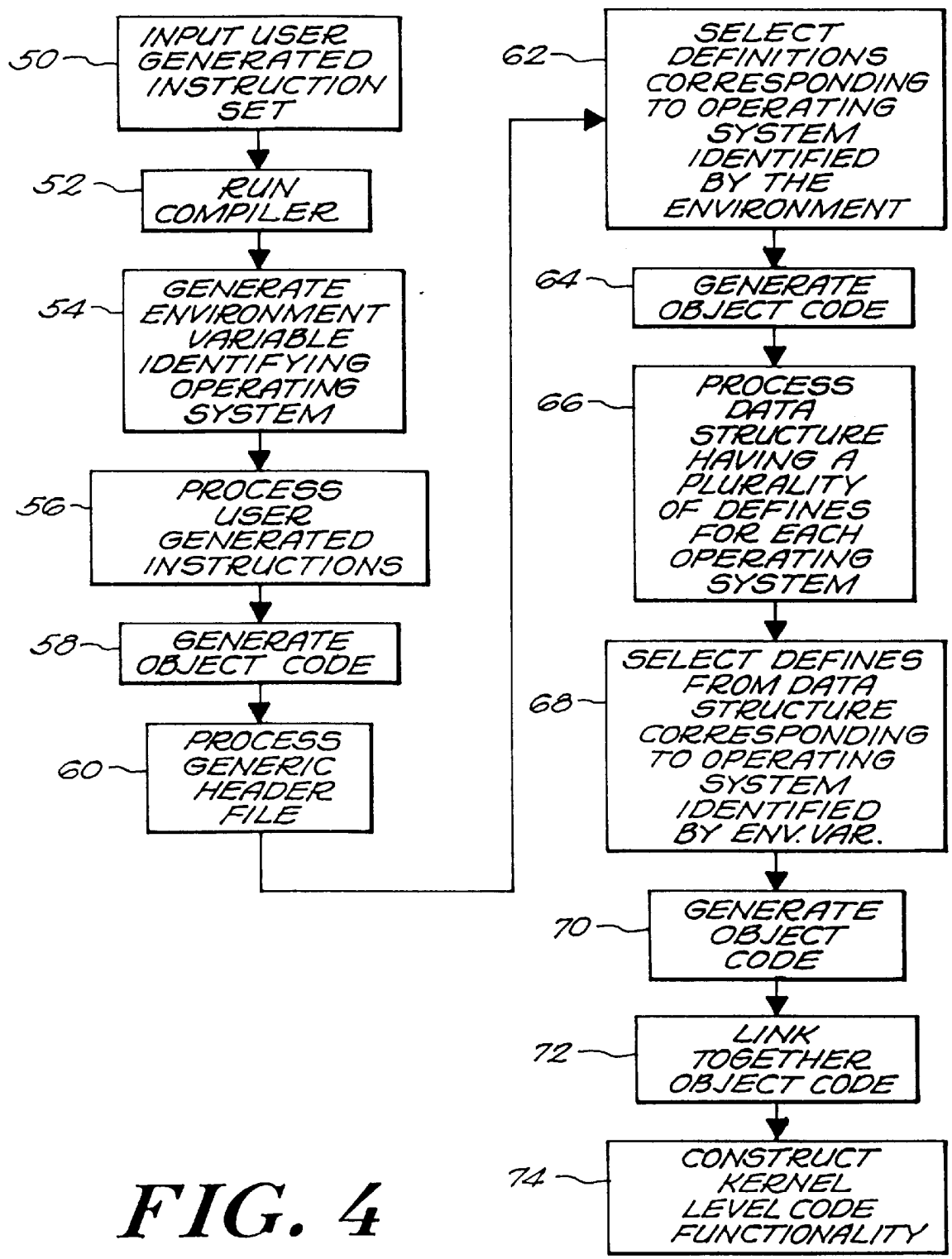
FIG. 4 is a flowchart diagram illustrating the process of accessing and compiling the data structures and one or more additional source code files according to the teachings of the present invention.
Figure 5:
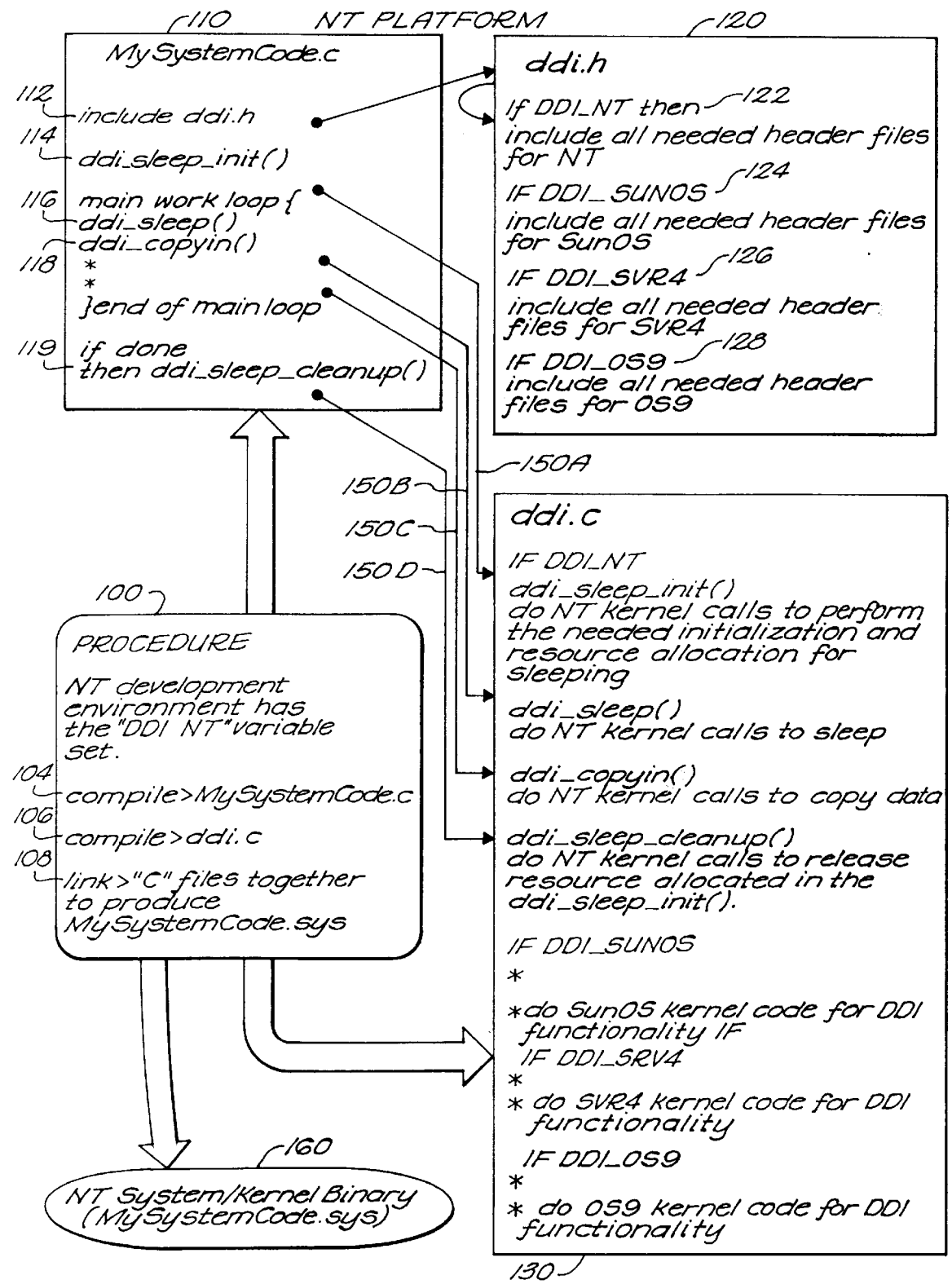
FIG. 5 schematically illustrates the processing selection of defines which constitute the data structures of FIGS. 3A and 3B as a function of the operating system of the host device.

FIGS. 4 and 5 illustrate the process performed by the compiler 26 when retrieving and compiling the data structures 36 and 38. Specifically, FIG. 4 is a flowchart diagram illustrating the compilation process and the formation of kernel level code from a generic data structures, e.g., data structures 36 and 38, that are specific to the operating system of the host device 12. FIG. 5 illustrates a practical working example of the system process shown in FIGS. 1–4.

With reference to FIG. 4, and specifically to step 50, the user inputs a set of instructions which address a user-defined task. After the user-generated set of instructions are inputted, the user inputs a make command which starts the compilation process. As part of this startup procedure, the compiler begins to run as identified by step 52. In response to the running of the compiler and in accordance with step 54, the operating system of the host device 12 generates an environment variable that flags or identifies the particular operating system of the host device. The preprocessor 28 of the compiler 26 then preprocesses the user generated instruction set, which is typically a source code file. This is shown by process step 56. If the user generated instruction set includes a call to a data structure, then the preprocessor interrupted, and the data structure is retrieved and processed. If the instruction set does not include a call to a data structure the preprocessor continues to process the user generated set and produces object code associated therewith. In accordance with step 58, the code generator 30 generates object code corresponding to the user-generated instructions.

As shown in step 60, the preprocessor then retrieves and processes the data structure of FIG. 3C, which is similar to a generic header file. The processor 28 then selects from the data structure those sub-structures, e.g., definitions and calls, that correspond to the operating system of the host device 12 as identified by the generated environment variable. Step 62 identifies this selection process. In accordance with step 64, the code generator 30 generates object code of the selected sub-structures that correspond to the operating system of the host device.

According to step 66, the preprocessor 28 then processes the data structure of FIGS. 3A/3B in response to another make command. Similar to above and as set forth in step 68, the preprocessor processes this data structure and extracts or selects the defines (system services) that correspond to the operating system of the host device, as identified by the generated environment variable. In step 70, the code generator 30 generates object code from the selected source code.

In accordance with step 72, the linker 32 then links the object code, which is typically in binary form, together. The processor 14 then constructs a selected functionality from this kernel level code (step 74). The host processor 14 constructs a selected functionality according to selected system directives 15. Thus, if a kernel level device driver is to be constructed from the compiled and linked code, then the system directives in conjunction with the processor form such a device driver.

FIG. 5 is an illustrative example of the compiling and linking of the data structures of the present invention. The procedure code block 100 includes, in this illustration, selected compile instructions contained within a make file of the host device 12. The system code block 110 contains a series of user-generated instructions. The data structure 38, e.g., generic header file, is denoted by code block 120, and data structure 36 is denoted by code block 130. As shown by the user-generated code block 110, the instruction set includes an include command to the header file 120, as well as a number of function calls 114, 116, 118 and 119. These function calls are defined by the selected generic defines contained within the second data structure 130.

The procedure code block 100 is a pictorial representation of the make commands, which the user of the process control system 10 of the present invention initiates, contained within the make file. If the operating system of the host device 12 is Windows NT, the host device 12 generates an environment variable, e.g., DDI_NT, that identifies the platform as a Windows NT platform. The make commands include a compile command 104 which instructs the compiler 26 to compile the system code block 110. Upon initiation of this command, the preprocessor 28 of the compiler 26 processes code block 110. During this preprocessing, the preprocessor is instructed by the include command 112 contained within the code block 110 to interrupt processing and to retrieve the generic header file 120. The include command is a preprocessor instruction that instructs the compiler 26 to access and retrieve a particular file and to include it in the preprocessing step. Include commands are known in the art and need not be defined further herein. The preprocessor 28 then processes the entire header file 120, and selects therefrom the sub-structures, e.g., definitions, calls, and constants, that are associated with the Windows NT operating system. Since the header file 120 typically includes a plurality of definitions and calls for each of a plurality of operating systems, the preprocessor selects only those sub-structures that correspond to the Windows NT environment.

The header file 120 can include a series of IF statements 122–128 which correspond to a number of different operating systems. The IF statement 122 is associated with the Windows NT environment, and is thus flagged by the DDI_NT environment variable. The sub-structures contained within the other IF statements and associated with other operating systems, such as SunOS, SVR4 and OS9, are not selected by the preprocessor. As illustrated by the IF statements 122 through 128, they can also contain an include command which further instructs the preprocessor to access and retrieve the proper header files for the particular operating system. In accordance with the present example, the include command instructs the preprocessor to retrieve header files for Windows NT.

The generic function calls 114–119, which form part of the user-generated code block 110, can be generic calls that are selected from a set of predetermined generic calls. For example, the generic calls 114–119 listed in code block 110 can be provided in a user manual that is used by the operator to select a number of function calls without necessitating the operator to customize code, to perform a user-defined task. The preprocessor then continues to process the generic function calls contained within the system code block 110. The code generator of the compiler generates kernel level code, which is typically contained within an object file stored at a selected memory location, virtual or real, in the memory element 16.

The procedure code block 110 includes another compile command 106 that instructs the compiler to compile the code block 130. The preprocessor 28 processes code block 130 and selects therefrom the defines that are associated with the Windows NT operating environment. As shown in code block 130, the selected IF statements corresponding to the environment variable DDI_NT includes a number of generic function calls for the Windows NT environment. The preprocessor selects these generic function calls in response to the environment variable and disregards the defines associated with the other operating systems, e.g., SunOS, SVR4 and OS9. After the preprocessor 28 processes and selects the appropriate defines associated with the Windows NT environment, the code generator 30 creates object code corresponding to these defines.

The system code block 110 which includes the function calls 114–119 represent initialized calls that refer to defines located in the code block 130. The initialized calls 114–119 are thus mapped, as illustrated by the arrows 150A–150D, to the corresponding generic function calls located in the block 130.

The linker 32 then links together the object files created from the system code block 110 and the data structure 130. Those files contain the kernel level code for the Windows NT system. The resultant combined kernel level code forms the system level code illustrated by the kernel level module 160.

Upon completion of the compiling process, the host device links together object files which represent all the generic function calls and definitions for the Windows NT operating system. This is advantageous since the system code block 110 includes a number of generic calls, thus eliminating the need of having an experienced programmer write system-specific code to effectuate the user-defined task. More specifically, the user need not be concerned about the particular operating system of the host device, since the user can effectuate a user-defined task by merely selecting from a number of generic calls located in the data structures of the present invention. The data structures thus provide a buffer between the user and the operating system of the host device to achieve an operating system independent method to perform user-defined tasks. Moreover, because the data structures 36, 38 are generic and contain definitions and calls for a number of different operating systems, the data structures are portable to multiple operating systems.

Another advantage of the present invention is that the compiler can produce operating system specific code for a number of different operating systems from the data structures of the present invention. The production of the kernel level code provides for a common API to peripheral process control devices, thus allowing for easier maintenance across currently supported operating systems as well as easing the time required to port code to disparate operating systems.

Still another advantage is that the data structures can be used with multiple operating systems, e.g., are operating system independent, since it is consistent with regard to calling syntax. Additionally, the users are isolated from the underlying native code which is used to effectuate the user-defined task.

Those of ordinary skill in computer and electrical engineering will recognize that modifications to the foregoing system and method and following software exist, and are deemed to fall within the scope and breadth of the present invention.

The generic defines which constitute the data structure of the present invention are described in further detail below.

General Design Features of the Data Structures

Initialization and cleanup system functions are provided herein by the following defines in conjunction with certain calls to allocate system resources. The users of selected defines, e.g., functions, that have associated initialization and cleanup functions must call these support routines regardless of the operating system platform of the host device.

Native function return codes and errors of the particulate operating systems are mapped into the data structures of the invention, e.g., data structure 36, and are defined in the generic header file, e.g., data structure 38.

The kernel level code generated according to the process of the present invention requires the user to support all return codes for a particular function regardless of the particular operating system of the host device. This feature guarantees portability of the data structures across all of the supported operating system environments.

The system header dependencies are contained within the data structure forming the generic header file, rather than being conditionally declared in individual source files for each operating system.

System Code Conventions

Certain functionality and return codes apply only to certain operating system environments. For instance the define FDDI_FAILURE may indicate one type of failure in one operating system, for example Solaris, but may indicate a completely different failure mode in another operating system, for example Windows NT. The following tags are used throughout this specification to indicate which operating systems are associated with a particular description.

SOL—Indicates a Solaris SVR4 association.

SOS—Indicates a SunOS association.

OS9—Indicates a Microware OS9 operating system association.

WNT—Indicated a Windows NT association.

External Interface of the Kernel level Code

The API of the present invention interfaces and is compatible with all of the calling conventions of the supported operating system environments. Currently, this interface is using the 'C' programming language as the only calling convention with specifics of the interface environments being done with #ifdefs.

Data Structures and Constituents

The following definitions, calls and constants, e.g., substructures, can compose part of the header file data structure, whereas the use of these defines can be located in another data structure.

- 15 -

1. FDDI_MUTEX sub-structure

This data structure defines for the various operating systems the data necessary to acquire critical system section access while operating on a thread of execution for the user.

typedef struct

- 16 -

```
     {
     #ifdef FDDI_SUNOS
         /*
          *  For SunOS 4.1.X all that is needed is to retain
          *  the current priority when we transition to the
          *  SPL softclock level.
          */
         int  current_priority ;
     #endif
     #ifdef FDDI_OS9
         /*
          *  Since the "COPRO OS9" operating system emulated
          *  the 4.1.X environment all we need to is act the same as 4.1.X
          */
         int  current_priority ;
     #endif
     #ifdef FDDI_SVR4
         /*
          *  For Solaris 2.X we need to actually have a real
          *  mutex variable.
          */
         kmutex_t mutex_lock ;
     #endif
     #ifdef FDDI_NT
         /*
          *  For NT we will use a pointer to a mutex object. Note:
          *  since all control like variables must reside in
          *  nonpaged memory ( i.e. allocated nonpaged.)
          */
         PKMUTEX mutex_lock ;
         STRING  string;
     #else
         char    mutex_name[ MAX_MUTEX_NAME_LEN ]; /* mutex ID string */
     #endif
     } FDDI_MUTEX , * PFDDI_MUTEX;
```

2.        FDDI_CONDVAR  sub-structure

- 17 -

This data structure defines for the various operating systems the data necessary to perform suspension & wakeup operations associated with a particular user ( data structure ).

```
typedef struct
{
#ifdef FDDI_SUNOS
    /*
     * For SunOS 4.1.X all that is needed is to maintain an
     * address upon which we can go to sleep.
     */
    int  cond_var ;
endif ifdef FDDI_OS9
    /*
     * Since the "COPRO OS9" operating system emulated
     * the 4.1.X environment all we need to is act the
     * same as 4.1.X
     */
    int  cond_var ;
endif ifdef FDDI_SVR4
    /*
     * For Solaris 2.X we need to actually have a real
     * condition variable variable.
     */
    condvar_t cond_var ;
endif ifdef FDDI_NT
    /*
     * For NT we will use an event variable. Since all
     * control like variables must reside in  nonpaged
     * memory we will point to the variable & allocate
     * it from nonpaged memory during init.
     */
    PKEVENT cond_var ;
```

- 18 -

```
      #endif
      } FDDI_CONDVAR, * PFDDI_CONDVAR ;

     3.            FDDI_TIMER   sub-structure

This data structure defines for the various operating systems the data
      necessary to startup and maintain an associated timer.

      typedef struct
      { if defined( FDDI_SUNOS ) || defined( FDDI_OS9 ) || defined( FDDI_SVR4 )

          /*
           * Need to retain the timer ID.
           */ int   timer_id ;
      #endif ifdef FDDI_NT

          /*
           * For NT timers we need to create a timer thread.  This
           * thread will use the data stored in this structure to
           * operate.
           */
          int   terminate; /* 0 = Allow thread, -1 = terminate on next tick */
          int   interval;  /* delay interval in 10ms ticks */
          void ( * func ) ();/* User supplied function to execute */
          int   param ;   /* User supplied context */
          HANDLE  TimerThreadHandle;

#endif

} FDDI_TIMER, * PFDDI_TIMER ;
```

- 19 -

4.    FDDI Return/Error Codes

The following codes are returned from the operating system as appropriate. The context of the codes may change depending on the function call and system type returning the code. Thus, the meaning of the return codes are defined in the description of the functions returning them. More specifically, the operating system generates a native return/error signal, which is then mapped by the operating system to a selected define to produce a generic return/error code, as listed below.

```
define FDDI_FAILURE define FDDI_SUCCESS define FDDI_SIGNAL_SEEN define FDDI_SIGNAL_NOT_SEEN define FDDI_SAME define FDDI_DIFFERENT
```

Listing of System Services

The kernel level API consists of a number of system services which are required regardless of which operating system the kernel code executes on. These services can form, according to one preferred practice, a data structure that includes a number of services for a number of different operating systems. These services can be generally categorized as follows:

⇒  Mutual exclusion service
⇒  Suspension or sleeping services
⇒  Resumption or wakeup services
⇒  Timer services
⇒  Data R/W access to/from user and kernel space

- 20 -

⇒ Kernel/system memory utilities
⇒ Kernel/system memory allocation

Specific functions (defines) that makeup the API and used to perform this generalized list of system services are described below. This list can be utilized by a user, such as by selecting one or more calls, to construct an instruction set to perform a user-defined task.

Each of the following defines includes a brief description, under the Description heading; a synopsis of the define, under the heading synopsis; a description of the return code generated by the particular define, under the Return code heading; a description of the input, under the Input heading; a description of what occurs as a result of the system call, under the Output section; and a high level description of the process occuring in the algorithm, under the Algorithm section.

1. fddi_mutex_init define

Description:

Perform initialization of a mutual exclusion (mutex) object. The caller is responsible for declaring the memory space for the FDDI_MUTEX object. This function must be called prior to using fddi_mutex_enter(), fddi_mutex_exit(), or fddi_mutex_cleanup(), all set forth below.

Synopsis:

```
int
fddi_mutex_init
(
        PFDDI_MUTEX mutex,
        char* mutex_name
);
```

Return Codes:

FDDI_SUCCESS - Associated with SOL, SOS, OS9, and WNT.
FDDI_FAILURE - Associated with WNT only. Indicates an allocation of

- 21 - nonpaged memory failure.

Input:

PFDDI_MUTEX mutex - a pointer to the caller allocated FDDI_MUTEX structure.
    char*    mutex_name - a pointer to a ASCII string which identifies the mutex.

Output:

The mutex name is copyied to the FDDI_MUTEX structure and the mutex is initialized (SOL & WNT only). Status of the call is returned.

Algorithm:
```
ALL
   copy the mutex name to the FDDI_MUTEX structure
SOS and OS9
   return( FDDI_SUCCESS )
SOL
   initialize the mutex
   return( FDDI_SUCCESS )
WNT
   allocate the actual mutex structure in nonpaged space
   if error allocating
      return( FDDI_FAILURE )
   initialize the mutex
   return( FDDI_SUCCESS )
```

2.        fddi_mutex_cleanup

Description:

Releases system resource associated with the mutex object. This function must be called when the kernel driver exits on a error or when the driver unloads.

Synopsis:

- 22 -

```
         void
         fddi_mutex_cleanup
         (
5          PFDDI_MUTEX  mutex
         );
```

Return Codes:

10    Not applicable.

Input:

PFDDI_MUTEX mutex - a pointer to the caller supplied mutex structure.
Output:

This call does not have a return code but results in mutex resources being released.
Algorithm:

SOS and OS9
        return
     SOL
        destroy the mutex
        return

     WNT
        free the allocated nonpage memory associated with the mutex.
        return
     3.          fddi_mutex_enter

Description:

- 23 -

This function obtains ownership of the mutex. The caller must declare the space for the FDDI_MUTEX object and have initialized it by calling fddi_mutex_init(). The mutex can be owned by only one process or thread at a time and can not be recursively entered.

Synopsis:

```
void
fddi_mutex_enter
(
   PFDDI_MUTEX mutex
);
```

Return Codes:

Not applicable.

Input:

PFDDI_MUTEX mutex - a pointer to the caller supplied mutex structure.

Output:

Upon returning from this function the caller has obtained ownership of the mutex and has exclusive access to the protected resource.

Algorithm:

```
SOS and OS9
   disable interrupts and save original IRQ state
   return
SOL
   obtain the mutex
   return
WNT
   wait for and obtain the mutex
   if an error occurs
      call fddi_error()
   return
```

- 24 -

4. fddi_mutex_exit

Description:

This function releases or gives up ownership of the mutex and therefore whatever resource it was protecting.

Synopsis:

```
void
fddi_mutex_exit
(
   PFDDI_MUTEX mutex
);
```

Return Codes:

Not applicable.

Input:

PFDDI_MUTEX mutex - a pointer to the caller supplied mutex structure.

Output:

Upon returning from this function the mutex and therefore whatever resource it was protecting have been released for access by other processes or threads.

Algorithm:

```
SOS and OS9
   restore interrupts to the original level
   return;
SOL
```

- 25 -

```
            release mutex ownership
            return
         WNT
            release mutex ownership
            if an error occurs
               call fddi_error()
            return
         5.         fddi_sleep_init Description:

                This procedure is called to initialize a condition variable on which to
         sleep. The caller is responsible for declaring the space for the FDDI_CONDVAR
         object. This function must be called prior to using fddi_sleep() , fddi_gsleep() or
         fddi_wakeup().

      Synopsis:

int
         fddi_sleep_init
         (
            PFDDI_CONDVAR condvar
         );

Return Codes:

      FDDI_SUCCESS - Associated with SOL, SOS, OS9, and WNT.
         FDDI_FAILURE - Associated with WNT only. This error indicates failure to
      allocate from the non-paged memory pool.

Input:
                  PFDDI_CONDVAR condvar - a pointer to a caller allocated
         FDDI_CONDVAR structure.
```

- 26 -

Output:

This function does nothing in the SOL, SOS, and OS9 operating system environments. In the WNT environment this function allocates a KEVENT object from the non-paged pool and initializes it. Status of the call is returned.

Algorithm:
SOL, SOS, and OS9
    return( FDDI_SUCCESS )
WNT
    allocate the KEVENT object from the non-paged pool
    if unable to allocate
        call fddi_error()
        return( FDDI_FAILURE )
    call KeInitializeEvent()
    return( FDDI_SUCCESS )

6.        fddi_sleep_cleanup

Description:

This routine releases resources that where allocated by the fddi_sleep_init() function. When a user of a sleep condition variable is finished with the variable, this routine is called.

Synopsis:

```
void
fddi_sleep_cleanup
(
   PFDDI_CONDVAR condvar
);
```

Return Codes:

Not applicable.

- 27 -

Input:

PFDDI_CONDVAR condvar - a pointer to a caller allocate FDDI_CONDVAR structure.

Output:

This function does nothing in the SOL, SOS, and OS9 operating system environments. In the WNT environment this function frees a KEVENT object previously allocated in the fddi_sleep_init() call.

Algorithm:

```
SOL, SOS, and OS9
    return

WNT
    if the KEVENT pointer is not NULL
        free the KEVENT object
        set the KEVENT pointer in the FDDI_CONDVAR structure = NULL
    return
```

7.  fddi_sleep

Description:

Fddi_sleep() suspends execution of a process indefinitely. In doing so the associated mutex is released prior to the sleep and re-acquired after the wakeup. Execution resumes after a controlling thread or process calls fddi_wakeup() with the unique PFDDI_CONDVAR pointer. No timed sleep is available.

Synopsis:

```
int
fddi_sleep
(
```

- 28 -

```
        PFDDI_CONDVAR   condvar ,
        PFDDI_MUTEX     mutex
);
```

Return Codes:

FDDI_FAILURE        - Associated with WNT only. This code indicates problems trying to release the mutex, acquire the mutex, or waiting for the event.

FDDI_SIGNAL_SEEN      - Associated with SOS, SOL, OS9, and WNT. This code indicates the process was awakened/alerted because of a signal and not from a wakeup call.

FDDI_SIGNAL_NOT_SEEN - Associated with SOS, SOL, OS9, and WNT. This code indicates the process was awakened because the wakeup call was issued.

Input:

PFDDI_CONDVAR condvar - a pointer to a unique FDDI_CONDVAR structure which is used to associate the sleep/wakeup calls.

PFDDI_MUTEX   mutex   - a pointer to the FDDI_MUTEX structure to be manipulated.

Output:

In the SOL and WNT environments, the result of this function executing is that the caller is suspended with the associated mutex having been released. After the fddi_wakeup is issued by another thread, the caller is resumed with the mutex having been re-acquired. Status of the call is returned.

In the OS9 and SOS environments the result of this function executing is the caller is suspended. After the wakeup is issued by another thread, the caller is resumed. Status of the call is returned.

Algorithm:

OS9 and SOS
        call sleep()

- 29 -

```
            if the return from sleep == 1
                    return FDDI_SIGNAL_SEEN
            else
                    return FDDI_SIGNAL_NOT_SEEN
    SOL
            call cv_wait_sig()
            if the return code == 0
                    return FDDI_SIGNAL_SEEN
            else
                    return FDDI_SIGNAL_NOT_SEEN WNT
            release the mutex
            if the release fails
                    call fddi_error()
                    return FDDI_FAILURE
            else the release was successful
                    wait (sleep) for the condition variable to be set
                    if the wait fails
                            call fddi_error()
                            return FDDI_FAILURE
                    else the wait was successful
                            wait to re-acquire the mutex
                            if the wait for the mutex fails
                                    call fddi_error()
                                    return FDDI_FAILURE
                            else the mutex was re-acquired
                                    if the wakeup from the wait was from a signal
                                            return FDDI_SIGNAL_SEEN
                                    else
                                            return FDDI_SIGNAL_NOT_SEEN
```

- 30 -

8.       fddi_gsleep (WNT only)

Description:

Fddi_gsleep() suspends execution of a process indefinitely. Execution resumes after a controlling thread or process calls wakeup() with the unique PFDDI_CONDVAR pointer. No timed sleep is available.

Synopsis:

```
int
fddi_gsleep
(
        PFDDI_CONDVAR condvar
);
```

Return Codes:

FDDI_FAILURE    - This code indicates problems waiting for the event.

FDDI_SIGNAL_SEEN - This code indicates the process was awakened/alerted because of a signal and not from a wakeup call.

FDDI_SUCCESS    - This code indicates the process was awakened because the wakeup call was issued.

Input:

PFDDI_CONDVAR condvar - a pointer to a unique FDDI_CONDVAR structure which is used to associate the sleep/wakeup calls.

Output:

The result of this function executing is the caller is suspended and a status code is returned upon resumption.

Algorithm:

wait (sleep) for the condition variable to be set
if the wait fails

-31-

```
                    call fddi_error()
                    return FDDI_FAILURE
            else the wait was successful
                    if the wakeup from the wait was from a signal
                            return FDDI_SIGNAL_SEEN
                    else
                            return FDDI_SUCCESS
```

9.     fddi_wakeup

Description:

Fddi_wakeup() causes a process or thread which was suspended (via fddi_xsleep) to resume execution. The argument pointing to the FDDI_CONDVAR is associated with the suspended thread and is used by fddi_wakeup to wakeup the sleeping thread. The condition variable should be unique for each sleep/wakeup combination.

Synopsis:

```
void
fddi_wakeup
(
        PFDDI_CONDVAR condvar
);
```

Return Codes:

Not applicable.

Input:

PFDDI_CONDVAR condvar - a pointer to a unique FDDI_CONDVAR structure which is used to associate the sleeping thread with the resumption capability of the fddi_wakeup call.

- 32 -

Output:

This function causes a thread which was suspended on a call to fddi_sleep() or fddi_gsleep() to resume execution.

Algorithm:

SOS and OS9
    call wakeup()
    return
SOL
    call cv_signal()
    return
WNT
    call KeSetEvent()
    return

10.    fddi_timeout

Description:

This routine causes the function whose address is passed to be executed when the time specified by the interval argument (which represents 10ms ticks) has elapsed.

Synopsis:
```
int fddi_timeout
(
         PFDDI_TIMER   timer  ,
  void ( *             func ) () ,
  int                  param  ,
  int                  interval );
```

Return Codes:
  FDDI_SUCCESS - Associated with all environments.
  FDDI_FAILURE - Associated with the WNT environment only. This code indicates failure to create the timer thread successfully.

- 33 -

Input:

PFDDI_TIMER timer - points to a user allocated FDDI_TIMER structure.
void ( * func ) () - the address of a function to execute at time-out time.
int param - an argument to provide context for the "func" routine.
int interval - the number of 10ms tick to wait before executing the specified function.

Output:

A timer is started which will dispatch the 'func' routine in the specified time and a status code is returned. In the WNT environment a system thread is created and associated with each FDDI_TIMER structure.

Algorithm:

```
SOS, SOL, and OS9
        call time-out()
        return FDDI_SUCCESS
WNT
        if the timer specified is initialize already
                return FDDI_SUCCESS
        initialize the timer structure
        Set the terminate flag = TIMER_ACTIVE
        create the timer thread
        if the thread failed to be created
                call fddi_error()
                return FDDI_FAILURE
        else
                return FDDI_SUCCESS
```

11. fddi_untimeout

Description:

This function stops a timer previously started by a fddi_timeout call.

Synopsis:

int

- 34 -

```
fddi_untimeout
(
        PFDDI_TIMER timer
)
```

Return Codes:

FDDI_SUCCESS - Associated with all environments.

Input:

PFDDI_TIMER  timer - points to a user allocated FDDI_TIMER structure.

Output:

The timer specified by the pointer to the FDDI_TIMER structure is stopped.  Status of the call is returned.

Algorithm:

```
SOS, OS9, and SOL
        call untime-out()
        return FDDI_SUCCESS

WNT
        set the terminate flag to TIMER_REQUEST_TERMINATE.
        clear the FDDI_TIMER function pointer.
   loop while the the terminate flag != TIMER_TERMINATED
        fddi_delay(1)
   loop end
   return FDDI_SUCCESS
```

12.        fddi_timer_main  (WNT only)

Description:

- 35 -

This function is the timer thread for the WNT environment. For each initial call to the fddi_timeout routine a timer thread will be created with execution for the thread starting at this function. The thread will delay execution for the specified interval which is in 10ms ticks and then execute the function call associated with the timer structure passed in.

Synopsis:

This function is not a callable routine as it does not return. It is a standalone thread of execution.
```
fddi_timer_main
(
        PFDDI_TIMER timer
)
```

Return Codes:

Not applicable.

Input:

PFDDI_TIMER timer - The initial context that is passed to the thread is a pointer to the FDDI_TIMER structure.

Output:

After delaying the specified interval the function associated with the timer is called.

Algorithm:
WNT only
```
        query for the number of 100nS 'ticks' per system clock tick
        calculate the 'delay_wanted' in 100nS granularity, of the interval
        calculate the number of ticks required ( 'timer_ticks =
delay_wanted+slop / ticks')
    calculate 'timer_delay' = timer_ticks * ticks
            if the timer_delay == NULL
                    call fddi_error()
            loop forever
                    calculate the delay as a relatively LARGE_INTEGER
```

- 36 -

```
                    delay execution for the specified interval time
                    if the delay failed
                            call fddi_error()
                    if the terminate flag is set to
TIMER_REQUEST_TERMINATE
                                    Set the terminate flag = TIMER_TERMINATED
        endif
                    call the user supplied timer function
            loop end
```

13.      fddi_delay

Description:

Fddi_delay causes the calling thread to suspend execution for the specified interval (in 10ms ticks).

Synopsis:

```
void
fddi_delay
(
        int interval
)
```

Return Codes:

Not applicable.

Input:

int interval - specifies the delay time in 10ms ticks.

Output:

The caller is suspended for 'interval'.

- 37 -

Algorithm:
SOS, SOL, and OS9
    DELAY( interval )
    return
WNT only
    query for the number of 100nS 'ticks' per system clock tick
    calculate the 'delay_wanted' in 100nS granularity, of the interval
    calculate the number of ticks required ( 'timer_ticks = delay_wanted+slop / ticks')
    calculate 'timer_delay' = timer_ticks * ticks
    if the timer_delay == NULL
        call fddi_error()
    calculate the delay as a relative LARGE_INTEGER
    delay execution for the specified interval time
    if the delay failed
        call fddi_error()
    return

14.     fddi_bcopy

Description:

This routine byte copies 'len' number of bytes from the memory pointed to by 'src' to the memory pointed to by 'dst'. There are no byte alignment requirements.

Synopsis:

```
void
fddi_bcopy
(
        void * src ,
        void * dst ,
        int len
)
```

Return Codes:

- 38 -

Not applicable.

Input:

void * src - a pointer to the memory to be copied.
    void * dst - a pointer to the memory to receive the copied data.
    int    len - total number of bytes to copy.

Output:

The memory contents pointed to be 'src' is copied to memory pointed to by 'dst for length 'len'.

Algorithm:

SOS, SOL, OS9
        call bcopy()
        return

WNT
        call RtlMoveMemory()
        return

15.    fddi_bzero

Description:

The fddi_bzero routine will zero a block of memory pointed to by a destination pointer and for a specified length.

Synopsis:

void
    fddi_bzero
    (
        void * dst ,

- 39 -

```
            int len
    )
```

Return Codes:

Not applicable.

Input:

```
void * dst  - a pointer to the memory to be zeroed.
int    len  - total number of bytes to zero.
```

Output:

The memory contents pointed to by 'dst' is zeroed for a given length.

Algorithm:

```
SOS, SOL, and OS9
        call bzero()
        return

WNT
        call RtlZeroMemory()
        return
```

16. fddi_bcmp

Description:

This routine compares two data buffers to determine if they are the same or different.

Synopsis:

int

- 40 -

```
fddi_bcmp
(
        char * data_one ,
        char * data_two ,
        int len
)
```

Return Codes:

FDDI_SAME        - returned if the two buffers are identical.

FDDI_DIFFERENT - returned if the two buffers are not identical.

Input:

char * data_one - a pointer to data buffer one to compare.
char * data_two - a pointer to data buffer two to compare.
int    len      - number of bytes to compare.

Output:

The two data buffers are compared and the result code is returned.

Algorithm:

SOS, SOL, and OS9
    call bcmp()
    if the compare result is 0
        return FDDI_SAME
    else
        return FDDI_DIFFERENT
WNT
    loop for the number of bytes to compare
        if the byte indexed in buffer1 is not equal to the indexed byte of buffer2
            return FDDI_DIFFERENT
    loop end
    return FDDI_SAME

- 41 -

17.     fddi_copyin

Description:

This function transfers data from application or user space into the kernel or system space.

Synopsis:

```
int
fddi_copyin
(
        void * usrc ,
        void * kdest ,
        unsigned  size
)
```

Return Codes:
FDDI_SUCCESS - the user buffer was transferred successfully.

FDDI_FAILURE - the user buffer was not transferred ( an invalid pointer was used ).

Input:

```
void * usrc       - a pointer to the user buffer to copy.
void * kdest      - a pointer to the kernel buffer to be copied into.
unsigned  size    - the number of bytes to copy.
```

Output:

The user buffer is copied to the system buffer and the status code is returned.

Algorithm:
SOS, SOL, and OS9
        call copyin()

- 42 -

```
                if copyin returns -1
                        return FDDI_FAILURE
                else
                        return FDDI_SUCCESS
        WNT
                        allocate a Memory Descriptor (MDL) to map the user memory
                        make the user memory resident and lock it in
                if an exceptions from the lock down occurs
                        return FDDI_FAILURE
                        map the user pointer into a kernel address
                        copy the user buffer to the kernel buffer
                        unlock the user memory
                        free the MDL
                        return FDDI_SUCCESS
```

18.        fddi_copyout

Description:

The fddi_copyout function copies data from kernel memory space to user memory space.

Synopsis:
```
    int
    fddi_copyout
    (
            void * ksrc ,
            void * udest ,
            unsigned size
    )
```

Return Codes:

FDDI_SUCCESS - the kernel buffer was transferred successfully to user space.

FDDI_FAILURE - the kernel buffer was not transferred ( an invalid pointer was used ).

- 43 -

Input:
    void * ksrc     - a pointer to the kernel buffer to copy.
    void * udest    - a pointer to the user buffer to be copied into.
    unsigned size   - the number of bytes to copy.

Output:

The kernel data buffer is copied to the user buffer and a status code is returned.

Algorithm:
    SOS, SOL, OS9
        call copyout()
        if copyout returns -1
            return FDDI_FAILURE
        else
            return FDDI_SUCCESS
    WNT
        allocate a Memory Descriptor (MDL) to map the user memory
        make the user memory resident and lock it in
    if an exceptions from the lock down occurs
            return FDDI_FAILURE
        map the user pointer into a kernel address
        copy the kernel buffer to the user buffer
        unlock the user memory
        free the MDL
        return FDDI_SUCCESS 19.        fddi_kmem_alloc

Description:

This function allocates a block of kernel memory and returns a pointer to it. The user supplies the size in bytes of the space to be allocated. If an area of the size specified can not be found a NULL is returned. The wait option guarantees the requrest will eventually succeed.

- 44 -

Synopsis:

```
void *
fddi_kmem_alloc
(
        unsigned int size ,
        int sleep_option
)
```

Returns:

A pointer to the allocated buffer or a NULL if no space was available.

Input:

unsigned int size - the size in bytes to allocate.
int sleep_option   - a flag indicating to wait or not (FDDI_WAIT, FDDI_NOWAIT)

Output:

A block of kernel memory is allocated and a pointer to it is returned or a NULL if no space is available.

Algorithm:

```
SOS, SOL, and OS9
        if sleep_option = FDDI_WAIT
                call kmem_alloc with a sleep flag
        else
                call kmem_alloc with a no-sleep flag
        return result of the allocation call
WNT
        call ExAllocatePool to allocate from the paged pool
    return result of the allocation call
```

- 45 -

20.　　fddi_kmem_free

Description:

This routine returns memory obtained from a previous call to fddi_kmem_alloc().The memory block must not be accessed after it is freed.

Synopsis:

```
void
fddi_kmem_free
(
        void * ptr ,
        unsigned size
        )
```

Return Codes:

Not applicable.

Input:

void * ptr　　- Specifies the address of the block of pool memory being deallocated.  This is the same pointer received from fddi_kmem_alloc().
unsigned  size - Associated with SOS,SOL,and OS9. The size of the buffer being freed.

Output:

The memory block is deallocated and returned to the pool.

Algorithm:

```
        SOS, SOL, and OS9
                call kmem_free()
                return
        WNT
                call ExFreePool()
                return
```

- 46 -

21. fddi_getuid

Description:

This function retrieves the User Id of the current process ( only useful in the SOS environment).

Synopsis:

FDDI_UID
fddi_getuid
(
)

Return Codes:

In the SOS and SOL environment the User ID is returned. OS9, and WNT environments do nothing.

Input:

None.

Output:

The User ID is read and returned to the caller.

Algorithm:

OS9, and WNT
    return 0
SOS
    return the UID of the current process (_u.uid)
SOL
  return the UID of the current process (curproc->p_uid)

- 47 -

22.     fddi_setuid

Description:

This function sets the User ID of the current process to the UID passed in.

Synopsis:

```
void
fddi_setuid
(
        FDDI_UID  uid
)
```

Return Codes:

Not Applicable.

Input:

FDDI_UID  uid

Output:

In the SOS and SOL environment the UID is set to the new value. OS9, and WNT environments do nothing.

Algorithm:

```
SOL, OS9, and WNT
        return
SOS
        set u.uid = uid
        return
SOL
```

- 48 -

```
set curproc->p_uid = uid
return
```

23.     fddi_getpid

Description:

The fddi_getpid() function returns to the caller the Process ID of the current process.

Synopsis:

```
FDDI_PID
fddi_getpid
(
)
```

Return Codes:

The PID is return.

Input:

None.

Output:

The Process ID is returned to the caller.

Algorithm:

```
SOS
        return from the _u the PID
OS9
        return the result of calling _os9_id()
SOL
        return from the curproc the PID
```

- 49 -

WNT
      return the result of calling PsGetCurrentProcess()

24.    fddi_halt

Description:

This function is called to halt or reboot the system.

Synopsis:

```
void
fddi_halt
(
);
```

Return Codes:

None.

Input:

None.

Output:

The system is rebooted or halted.

Algorithm:

SOS and OS9
    halt(0)
SOL
    boot( RB_HALT)
WNT
    call KeBugCheck()

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A computer processing method for generating operating system specific kernel level code in a computer host device on which is running a particular operating system, comprising the steps of:

generating an environment variable indicative of the particular operating system running on the host device, providing a first data structure having a plurality of sub-structures for each of a plurality of differing operating systems, wherein each sub-structure corresponds to an operating system code block for inclusion in the operating system specific kernel level code, determining selected ones of said sub-structures that correspond to said particular operating system in response to said generated environment variable, providing a second data structure having a plurality of defines for a plurality of differing operating systems, wherein each define represents at least one function call that is native to an associated one of the operating systems, determining said defines corresponding to said particular operating system in response to said generated environment variable, and linking said selected sub-structures and said defines corresponding to said particular operating system to construct kernel level code specific to said particular operating system.

2. A method according to claim 1 further comprising the steps of:

inputting a series of user-generated instructions, processing said user-generated instructions, and linking said processed user-generated instructions with said selected sub-structures and said defines to construct said kernel level code.

3. A method according to claim 2 wherein said step of inputting said user-generated instructions further includes the step of constructing said instructions to include calls to at least one of said first and second data structures.

4. A method according to claim 2 wherein said step of determining said sub-structures further includes the steps of:

storing said first data structure in a memory element of said host device, and selecting from said first data structure said sub-structures corresponding to said particular operating system.

5. A method according to claim 2 wherein said step of determining said sub-structures further includes the step of:

compiling said first data structure to produce said kernel level code specific to said particular operating system.

6. A method according to claim 5 wherein said step of compiling further includes the steps of:

pre-processing said first data structure, selecting from said pre-processed first data structure said sub-structures that correspond to said particular operating system, and generating said kernel level code.

7. A method according to claim 6 wherein said step of pre-processing further includes the step of parsing said first data structure.

8. A method according to claim 2 wherein said step of determining said defines further includes the steps of:

storing said second data structure in a memory element of said host device, and selecting from said second data structure said defines corresponding to said particular operating system.

9. A method according to claim 2 wherein said step of determining said defines further includes the step of:

compiling said second data structure to produce said kernel level code specific to said particular operating system.

10. A method according to claim 9 wherein said step of compiling further includes the steps of:

pre-processing said second data structure, selecting from said pre-processed second data structure said defines that correspond to said particular operating system, and generating said kernel level code.

11. A method according to claim 10 wherein said step of pre-processing further includes the step of parsing said second data structure.

12. A method according to claim 1 wherein said step of determining selected ones of said sub-structures further includes the steps of:

storing said first data structure in a memory element of said host device, and selecting from said first data structure selected said sub-structures corresponding to said particular operating system.

13. A method according to claim 1 wherein said step of determining selected ones of said sub-structures further includes the step of:

compiling said first data structure to produce said kernel level code specific to said particular operating system.

14. A method according to claim 13 wherein said step of compiling further includes the steps of:

pre-processing said first data structure, selecting from said pre-processed first data structure said selected sub-structures that correspond to said particular operating system, and generating said kernel level code.

15. A method according to claim 14 wherein said step of pre-processing further includes the step of parsing said first data structure.

16. A method according to claim 1 wherein said step of determining said defines further includes the steps of:

storing said second data structure in a memory element of said host device, and selecting from said second data structure said defines corresponding to said particular operating system.

17. A method according to claim 1 wherein said step of determining said defines further includes the step of:

compiling said second data structure to produce said kernel level code specific to said particular operating system.

18. A method according to claim 17 wherein said step of compiling further includes the steps of:

pre-processing said second data structure, selecting from said pre-processed second data structure said defines correspond to said particular operating system, and generating said kernel level code.

19. A method according to claim 18 wherein said step of pre-processing further includes the step of parsing said second data structure.

20. A method according to claim 1 further including the step of constructing an operating system specific, kernel-level device driver from said kernel level code.

21. A method according to claim 1 further comprising the step of constructing said data structures to be portable to differing operating systems.

22. A method according to claim 1 further comprising the step of constructing said first and second data structures such that a number of operating systems for which said data first structure and said second data structure are provided is greater than the number of operating systems operating said host device.

23. A method according to claim 1 further comprising the step of constructing one of said first and second data structures to be portable to differing operating systems.

24. A method of forming an operating system specific kernel level device driver in a computer host device operated by a particular operating system, comprising the steps of:
 providing a series of user-generated instructions,
 generating an environment variable indicative of the particular operating system of the host device,
 providing a first data structure having a plurality of sub-structures for each of a plurality of differing operating systems,
 determining selected ones of said sub-structures that correspond to said particular operating system in response to said generated environment variable,
 providing a second data structure having a plurality of defines for a plurality of differing operating systems,
 determining said defines corresponding to said particular operating system in response to said generated environment variable,
 compiling said user-generated instructions, to generate object code for said user-generated instructions,
 generating object code for said selected sub-structures and for said defines corresponding to said particular operating system,
 linking said object code for selected sub-structures and said object code for said defines corresponding to said particular operating system and said object code for said user-generated instructions, and
 constructing said operating system specific kernel level device driver.

25. A method according to claim 24 wherein said step of determining selected ones of said sub-structures further includes the steps of:
 storing said first data structure in a memory element of said host device, and
 selecting from said first data structure said sub-structures corresponding to said particular operating system.

26. A method according to claim 24 wherein said step of determining selected ones of said sub-structures further includes the step of:
 compiling said first data structure to produce said kernel level device driver.

27. A method according to claim 26 wherein said step of compiling further includes the steps of:
 pre-processing said first data structure,
 selecting from said pre-processed first data structure said sub-structures that correspond to said particular operating system, and
 generating kernel level code.

28. A method according to claim 24 wherein said step of determining said defines further includes the steps of:
 storing said second data structure in a memory element of said host device, and
 selecting from said second data structure said defines corresponding to said particular operating system.

29. A method according to claim 28 wherein said step of determining said defines further includes the step of:
 compiling said second data structure to produce said kernel level device driver.

30. A method according to claim 29 wherein said step of compiling further includes the steps of:
 pre-processing said second data structure,
 selecting from said pre-processed second data structure said defines that correspond to said particular operating system, and
 generating kernel level code.

31. A method according to claim 24 wherein said step of providing said user generated instructions includes the step of constructing said instructions to include calls to at least one of said first and second data structures.

32. A method for creating an operating system specific, kernel-level device driver of a host device that communicates with one or more peripheral process control devices, said host device being operated by a particular operating system, comprising the steps of:
 storing a first data structure in a memory element of said host device, said first data structure including a plurality of sub-structures for a plurality of differing operating systems,
 selecting from said first data structure said sub-structures corresponding to said particular operating system,
 storing a second data structure in the memory element, said second data structure including a plurality of defines for a plurality of differing operating systems,
 selecting from said second data structure said defines corresponding to said particular operating system,
 linking said selected sub-structures and said defines,
 forming said operating system specific, kernel-level device driver from said linked sub-structures and defines, and
 establishing a communication pathway between said device driver and the one or more peripheral process control devices.

33. A method according to claim 32 further including the step of generating an environment variable identifying said particular operating system.

34. A method according to claim 32 wherein said step of selecting from said first data structure further includes the step of:
 compiling said first data structure to produce kernel level code specific to said particular operating system.

35. A method according to claim 34 wherein said step of compiling further includes the steps of:
 pre-processing said first data structure, and
 generating said kernel level code.

36. A method according to claim 32 wherein said step of selecting from said second data structure further includes the step of:
 compiling said second data structure to produce kernel level code specific to said particular operating system.

37. A method according to claim 36 wherein said step of compiling further includes the steps of:
pre-processing said second data structure, and
generating said kernel level code.

38. A system for creating operating system kernel level specific code in a host device operated by a particular operating system, comprising:
processor means for executing and retrieving said code,
memory means in communication with said processor means for storing a first data structure having a plurality of sub-structures corresponding to a plurality of differing operating systems, an environment variable indicative of said particular operating system, and a second data structure having a plurality of definitions for a plurality of differing operating systems,
first determination means for determining selected ones of said sub-structures corresponding to said particular operating system in response to said environment variable,
second determination means for determining given ones of said definitions corresponding to said particular operating system in response to said environment variable, and
linking means for linking said selected sub-structures and said given definitions to construct said operating system specific kernel level code.

39. A system according to claim 38 further comprising:
means for inputting user-generated instructions,
means for processing said user-generated instructions, and
second linking means for linking said processed user-generated instructions with said selected sub-structures and said definitions to construct said kernel level code.

40. A system according to claim 38 wherein said first determination means further includes means for selecting from said first data structure said sub-structures corresponding to said particular operating system.

41. A system according to claim 38 wherein said second determination means further includes means for compiling said first data structure to produce said kernel level code specific to said particular operating system.

42. A system according to claim 41 wherein said compiling means further includes:

means for pre-processing said first data structure,
means for selecting from said pre-processed first data structure said sub-structures that correspond to said particular operating system, and
means for generating said kernel level code.

43. A system according to claim 38 wherein said second determination means further includes means for selecting from said second data structure said definitions corresponding to said particular operating system.

44. A system according to claim 38 wherein said second determination means further includes means for compiling said second data structure to produce said kernel level code specific to said particular operating system.

45. A system according to claim 44 wherein said means for compiling further includes:
means for pre-processing said second data structure,
means for selecting from said pre-processed second data structure said definitions that correspond to said particular operating system, and
means for generating said kernel level code.

46. A system according to claim 38 further including means for constructing an operating system specific, kernel-level device driver from said kernel level code.

47. A machine-readable data storage medium for storing a computer program for practicing a method, comprising the steps of:
providing a first data structure having a plurality of sub-structures corresponding to a plurality of differing operating systems,
providing a second data structure having a plurality of defines corresponding to a plurality of differing operating systems,
compiling and linking said first and second data structures to selected ones of said sub-structures and said defines corresponding to a selected one of the operating systems to produce kernel level code corresponding to said selected operating system.

48. The data storage medium of claim 47 wherein said kernel level code forms a kernel level device driver.

* * * * *